Dec. 16, 1952     C. E. SNYDER     2,621,700
VALVE CONSTRUCTION
Filed April 29, 1949
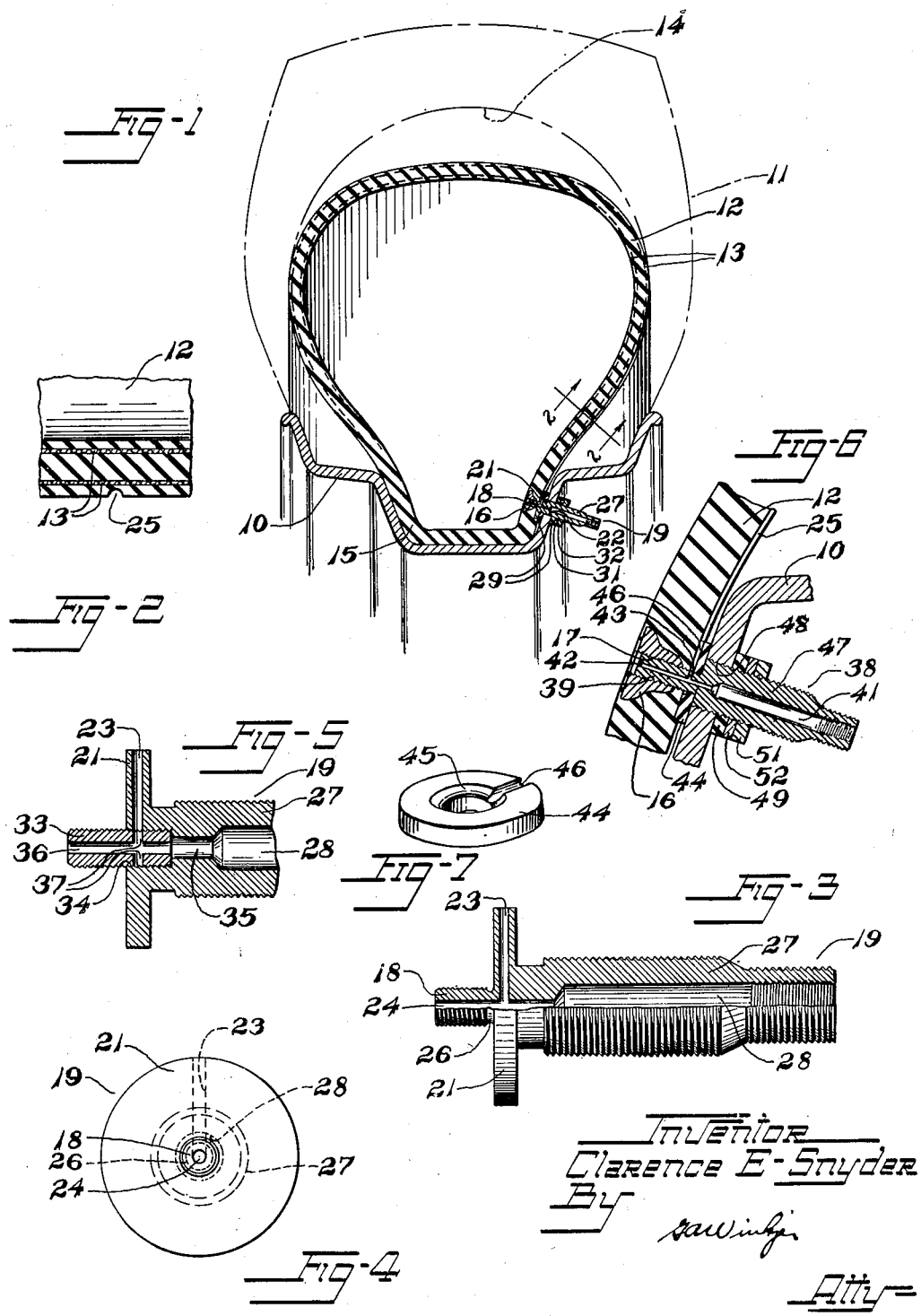
Inventor
Clarence E. Snyder
By
Atty Patented Dec. 16, 1952

2,621,700

UNITED STATES PATENT OFFICE 2,621,700

VALVE CONSTRUCTION

Clarence E. Snyder, Akron, Ohio, assignor to The B. F. Goodrich Company, New York, N. Y., a corporation of New York Application April 29, 1949, Serial No. 90,451

8 Claims. (Cl. 152—427)

This invention relates to valves for inner tubes and especially to valves for safety tubes constructed to provide auxiliary air chambers in tires for preventing damage to the tires and loss of control of the vehicle upon which they are mounted by retarding deflation of the tires after a puncture or blowout.

When the tire is deflated, as by puncturing, the crown portion of the tire engages the outer peripheral portion of the tube. The action of the tire on the tube tends to move the tube relative to the rim and in some cases the valve, which has been secured both to the tube and to the rim, has been torn from the inner tube. It is difficult and sometimes practically impossible to repair damage of this kind. The action is so severe that merely reinforcing the valves and tubes has not satisfactorily solved the problem, and at the same time adds weight and material in vain.

It is an object of this invention to provide an improved valve construction for preventing damage to the tube upon deflation of the running tire, to provide an expendable valve stem part, injury of which is not objectionable, to provide for quick and convenient replacement and to provide convenience of manufacture and effective operation under normal running conditions.

These and other objects will be apparent from the following description, reference being had to the drawings in which:

Fig. 1 is a sectional view of a valve structure constructed in accordance with and embodying the invention, showing the tube mounted on a rim and within a tire shown in broken lines.

Fig. 2 is a section of the tube taken along lines 2—2 of Fig. 1, parts being broken away.

Fig. 3 is an enlarged elevation of the valve stem structure shown in Fig. 1, parts being sectioned.

Fig. 4 is an end view of the valve stem structure shown in Fig. 3.

Fig. 5 is a sectional view of a modified valve stem construction embodying the invention.

Fig. 6 is a sectional view of another modification embodying the invention showing the tube and rim, parts being broken away.

Fig. 7 is a perspective view of the washer shown in Fig. 6.

Referring to the drawings and especially to the embodiment of Figs. 1 to 4, a tire rim 10, which may be of the drop center type, has a tire 11 mounted thereon. The tire 11 shown in broken lines is of the type which does not require an inner tube to retain the air. Within the tire is mounted an annular safety tube 12 of resilient rubber or other rubber-like material. The tube 12 has reinforcing plies 13, 13 embedded in the tube at the outer periphery for preventing contact of the tube with the crown portion 14 of the tire 11. The inner peripheral portion 15 of the tube 12 is molded to a diameter such that it may snap over the rim 10 and resiliently grip the rim. The outer circumference of the tube 12 may be less than the inner periphery of the tire to provide the tire with two chambers for retarding the deflation of the tire upon puncture or blowout, to prevent damage to the tire by pinching between the rim and bead and to prevent loss of control of the vehicle by the driver.

In accordance with the invention the tube 12 has a spud or reinforcing member 16 embedded therein and secured to the tube by suitable means such as by vulcanization. The reinforcing member 16 has a threaded aperture 17 for receiving a threaded tubular stud 18 of a valve stem 19 which is shown in Fig. 3. The tube 12 has openings leading to the reinforcing member 16 through which the valve stem 19 may be inserted for engagement with the reinforcing member and through which air may pass into the tube.

The valve stem 19 has a radially extending flange 21 adjacent the stud 18 for preventing the valve stem 19 from passing outwardly through a valve-stem receiving aperture 22 in the rim 10. The flange 21 has a radially extending passage 23 leading from an axially extending passage 24 in the stud 18 to an opening in the periphery of the flange. At the periphery of the flange 21 the passage 23 is aligned with a groove 25 in the face of the tube 12. The groove 25 extends radially outward along the face of the tube 12 providing a passage through which air may pass to inflate the space between the tire and the tube.

The tubular stud 18 of the valve stem is threaded along its length to a position just short of the flange 21. At this position the wall thickness is substantially reduced or necked providing a weakened portion 26 of the valve stem. The thickness of the weakened portion 26 is preferably small enough to cause failure at the weakened portion before failure of the tube 12 occurs when the tube is subjected to tearing stresses imposed by movement of the tube relative to the valve. When the valve stem 19 is broken off at the weakened portion 26 a replacement valve stem 19 may be screwed in the aperture 17 after removing the stud 18.

The valve stem 19 has a heavy threaded shank 27 at the end of the valve which projects through the rim aperture 22. A valve chamber 28 is provided within the shank 27 for valves of conventional types not shown in the drawings. The chamber 28 is connected to the passages 23 and 24 at one end and is open to the atmosphere at the other end for receiving an air supplying means to inflate the tire and tube.

The valve stem 19 projects through the aperture 22 in the rim 10 and sealing washers 29, 29 of resilient rubber or other rubber-like material are disposed at opposite sides of the rim and about the valve stem. A washer 31 which may be of metal is disposed outwardly of the sealing washer 29 at the outside of the rim 10 and a nut 32 is threaded on the shank 27 for moving the washer 31 toward the flange 21 and clamping the rim between the sealing washers 29, 29.

The safety tube 12 is installed with the passage 23 in the flange 21 aligned with the groove 25 in the tube 12. The sealing washers 29, 29, washer 31 and nut 32 are placed over the shank of the valve stem and the nut is threaded on the shank to clamp the rim 10 between the sealing washers 29, 29 forming an air tight seal at the rim.

To inflate the assembly air under pressure is forced into the chamber 28 of the valve stem and is valved into the passages 23 and 24 in the tubular stud 18 and flange 21. The passages 23 and 24 are preferably of the same diameter and meter air at the same rate into the inner chamber in tube 12 and into the outer chamber between the tire 11 and the tube.

Upon puncture of the tire 11 rapid deflation may take place until the outer periphery of the safety tube 12 engages the crown portion 14 of the tire. The safety tube 12 then supports the tire and the air escapes slowly from the tube through the passages 23 and 24 retarding the deflation of the tire.

When the safety tube 12 supports the tire 11 the tube is urged circumferentially relative to the rim 10 as the tire turns and the resulting forces tend to pull the valve stem 19 with the tube. Under these forces the stud 18 will break away from the valve stem 19 at the weakened portion 26 and the tube will be relieved from excessive stresses at the portion adjacent the reinforcing member 16 in which the stud 18 is threaded.

When the tire is repaired the severed stud 18 is removed from the reinforcing member 16 and the stud of a replacement valve stem 19 is screwed in. The tube 12 is maintained intact and is usable again without requiring repair.

In Fig. 5 a modification is shown in which the valve stem 19 is constructed with a hollow tubular stud 33 which is attached to the valve stem by threaded engagement. The valve stem 19 has a threaded axial aperture 34 at the flanged end for receiving the stud 33 in threaded engagement. This aperture 34 connects with a passage 35 opening on the valve chamber 28. When the tubular stud 33 is threaded in the aperture 34 an axial passage 36 in the stud opens on the passage 35 in the valve stem. A radial passage 37 is provided in the tubular stud 33 at a position which is in alignment with the passage 23 of flange 21 when the stud is threaded and bottomed in the aperture 34. The passages 23, 36 and 37 may be of any desired size. However it is preferable that the passages have the same cross sectional area for metering the air from the valve chamber 28 into the inner and outer chambers in the tire.

In operation, the stud 33 is threaded in the reinforcing member 16 of the tube 12 and the valve stem is secured to the rim 10 in sealing engagement by nut 32, washer 31 and sealing washers 29, 29, as described for the construction shown in Figs. 1 to 4. When the tire 11 is punctured and deflates to a point where the tube 12 supports the tire, the tube is urged circumferentially of the rim as the tire turns. In this modification the tube 12 is relieved of excessive stress by the breaking away of the stud 33 at the portion having aperture 37. The aperture 37 weakens the stud sufficiently to precipitate failure at that portion before failure of the tube takes place. The strength of this portion may be decreased further, if desired, to lower the force necessary to cause yielding, by providing more holes in the stud at this position.

When the tire is repaired the valve stem 19 may be furnished with a new stud 33 and threaded in the reinforcing member 16 of the tube after the severed pieces of the stud are removed. With this construction the only new part necessary is a new stud 33, and no damage results to the valve stem 19 and reinforcing member 16 upon movement of the tube 12 relative to the rim 10.

In Fig. 6 another modification is shown in which the valve stem 38 has a stud portion 39 integral therewith. The stud portion 39 is threaded for engaging the reinforcing member 16 of the tube 12. The valve 38 has a valve chamber 41 which connects with an axially extending passage 42 in the stud portion 39 for conducting air into the tube. A radial passage 43 is disposed in the stud portion 39 at a position which coincides with the outer surface of the tube 12 when the stud portion is threaded in the reinforcing member 16. The radial passage 43 connects with axial passage 42 for conducting air from the valve to the outer chamber between the rim 10 and the tube 12.

A sealing washer 44 as shown in Fig. 7 may be disposed between the rim 10 and tube 12 and about the stud portion 39. A circumferential groove 45 in the inner face at the inner periphery of the washer 44 is provided into which the radial passage 43 of the stud portion 39 opens. The groove 45 is connected to the outer periphery of the washer 44 by a groove 46 which is aligned with groove 25 in the tube 12 for conducting air from the valve stem to the space between the tire 11 and tube 12.

As shown in Fig. 6 the valve stem 38 has a shank portion 47 which is threaded in a threaded aperture 48 in the rim 10. A sealing washer 49 disposed about the shank portion 47 is clamped on the rim 10 by a nut 51 threaded upon the shank portion and bearing against a washer 52 which abuts sealing washer 49.

In operation the tube is placed around the rim 10 and the valve stem 38 is threaded in the reinforcing member 16 and rim 10 simultaneously for clamping the washer 44 between the tube and rim. The sealing washer 49 and washer 52 are placed about the shank portion 47 of the valve stem 38 and a nut 51 is threaded on the shank clamping the sealing washer against the rim providing an air tight seal. Air may then be injected into the valve chamber 41 and through passages 42 and 43 which are preferably the same size into the tire and tube enclosed spaces.

Upon deflation of the tire 11 the crown portion 14 will engage the outer periphery of the tube 12 urging the tube circumferentially of the tire relative to the rim upon turning of the tire. The valve stem 38 will resist movement of the tube until the stresses are sufficient to break off the stud portion 39 at the weakened portion containing passage 43. The weakened portion is designed with a yielding strength below the strength of the tube 12 in order that failure of the valve stem will occur prior to failure of the tube to prevent damage to the tube. When the tire 11 is repaired it is a simple operation to remove the valve stem 38 from the rim and remove the stud portion 39 from the tube reinforcing member 16. A replacement valve stem 38 may then be installed when the tire is remounted on the rim 10 and the tire may be reinflated without requiring repair of the tube 12.

Variations may be made without departing from the scope of the invention as it is defined in the following claims.

I claim:

1. A rim and pneumatic tire inner tube assembly subject to forces tending to turn the inner tube relative to the rim upon deflation of the running tire, said assembly comprising a valve structure attached to said inner tube and projecting through an aperture in said rim, said valve structure comprising a tubular member having a passage therethrough and a portion relatively weak in comparison with the other portions of said structure and with the inner tube so as to be preferentially ruptured under excessive forces tending to turn the inner tube relative to the rim, the relatively weak portion having an aperture in the wall thereof opening in the passage within said tubular member and an annular element disposed about said valve structure at said aperture for locally separating said rim and said inner tube, and said annular element having a groove connecting said aperture with the area of local separation between said inner tube and said rim.

2. A tire valve structure for mounting on an inner tube, said valve structure comprising a tubular member having a passage therethrough and a valve chamber therein, an inner tube connection disposed at one end of said tubular member and a radially extending flange disposed between the portion containing said valve chamber and said inner tube connection, said flange having through the same a radially extending passage connecting with the passage in said tubular member for communication with said valve chamber, said inner tube connection having an end portion for attachment to the inner tube and an adjoining portion connecting said end portion and said tubular member, said adjoining portion being weakened in comparison with other portions of said structure and with the inner tube so as to be preferentially ruptured and said adjoining portion being disposed in close proximity to said flange.

3. A tire valve structure for mounting on an inner tube, said structure comprising a tubular member having a passage therethrough and a valve chamber therein, an inner tube connection disposed at one end of said tubular member and a radially extending flange disposed between the portions containing said valve chamber and said inner tube connection, said flange having a radially extending inflating passage connecting with the passage in said tubular member for communication with said valve chamber, and said inner tube connection having an inflating passage connecting with the passage in said tubular member, the inflating passages of the valve structure intersecting in the region of said flange providing by such intersection a portion weakened in comparison with other portions of said structure and with the inner tube so as to be electively predisposed to rupture.

4. A tire rim and inner tube assembly subject to forces tending to turn the inner tube relative to the rim upon deflation of the running tire, said assembly comprising a valve structure having a portion attached to said inner tube and a second portion attached to said rim and a connecting portion intermediate said portion attached to said inner tube and said second portion, said connecting portion being relatively weak in comparison with the other portions of said structure and with the inner tube so as to be preferentially ruptured under excessive forces tending to turn the inner tube relative to the rim.

5. A tire valve structure for use on an inner tube subject to forces tending to turn the inner tube relative to a rim upon which the tire is mounted, said valve structure comprising a tubular member for conducting inflating fluid into the inner tube, said member having a portion adapted to be attached to the rim, an end portion for attachment to said inner tube and a connecting portion intermediate the rim attaching and inner tube attaching portions of said tubular member and said connecting portion being relatively weak in comparison with other portions of said structure and with the inner tube so as to be preferentially ruptured under excessive forces tending to turn the inner tube relative to the rim.

6. A tire valve structure for mounting on an inner tube, said valve structure comprising a tubular portion having a passage therethrough and a valve chamber therein, an inner tube attaching portion at one end of said valve structure, a connecting portion disposed between said tubular portion and said inner tube attaching portion, said connecting portion having a radially extending passage connecting with the passage in said tubular portion for communication with said valve chamber, and said connecting portion being weakened in comparison with other portions of said structure and with the inner tube so as to be preferentially ruptured under excessive forces tending to turn the inner tube relative to the rim.

7. A tire valve structure for use on an inner tube subject to forces tending to turn the inner tube relative to the rim upon which the tire is mounted, said valve structure comprising a tubular portion having a valve chamber and a passage therethrough for conducting inflating fluid into the inner tube, said tubular portion being adapted to be attached to the rim, an inner tube attaching portion at one end of said valve structure, a connecting portion intermediate said tubular portion and said inner tube attaching portion and having a radially extending passage connecting with the passage in said tubular portion for communication with said valve chamber, and said connecting portion being relatively weak in comparison with other portions of said structure and with the inner tube so as to be preferentially ruptured under excessive forces tending to turn the inner tube relative to the rim.

8. A tire rim, inner tube, and valve structure assembly subject to forces tending to turn the inner tube relative to the rim upon deflation of a running tire on the rim, said valve structure comprising a tubular portion having a valve chamber and a passage therethrough for conducting inflating fluid into the inner tube, said tubular portion being attached to the rim, a second portion attached to the inner tube, and a connecting portion intermediate said tubular and second portions having a radially extending passage connecting with the passage in said tubular portion for communication with said valve chamber, and said connecting portion being relatively weak in comparison with said other portions of the assembly so as to be preferentially ruptured under excessive forces tending to turn the inner tube relative to the rim.

CLARENCE E. SNYDER.

REFERENCES CITED

The following references are of record in the file of this patent:

UNITED STATES PATENTS

| Number | Name | Date |
|---|---|---|
| 310,490 | Atwood & Slate | Jan. 6, 1885 |
| 1,934,468 | Hudson | Nov. 7, 1933 |
| 2,241,847 | Eberhard et al. | May 13, 1941 |
| 2,322,500 | Armstrong | June 22, 1943 |

FOREIGN PATENTS

| Number | Country | Date |
|---|---|---|
| 113,611 | Australia | Aug. 5, 1941 |